Oct. 1, 1957 L. SERVANTY 2,807,966
CONTROL TRANSMISSION SYSTEMS
Filed Sept. 23, 1953
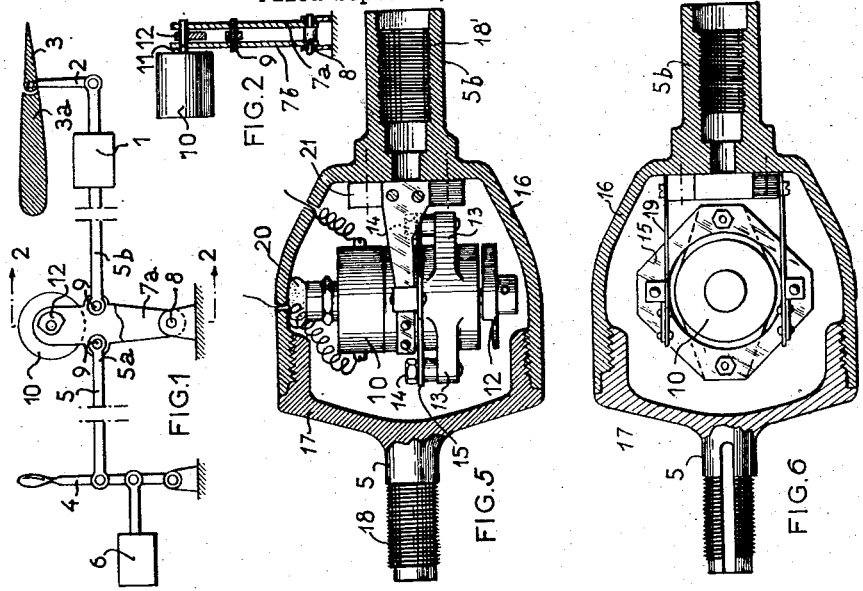
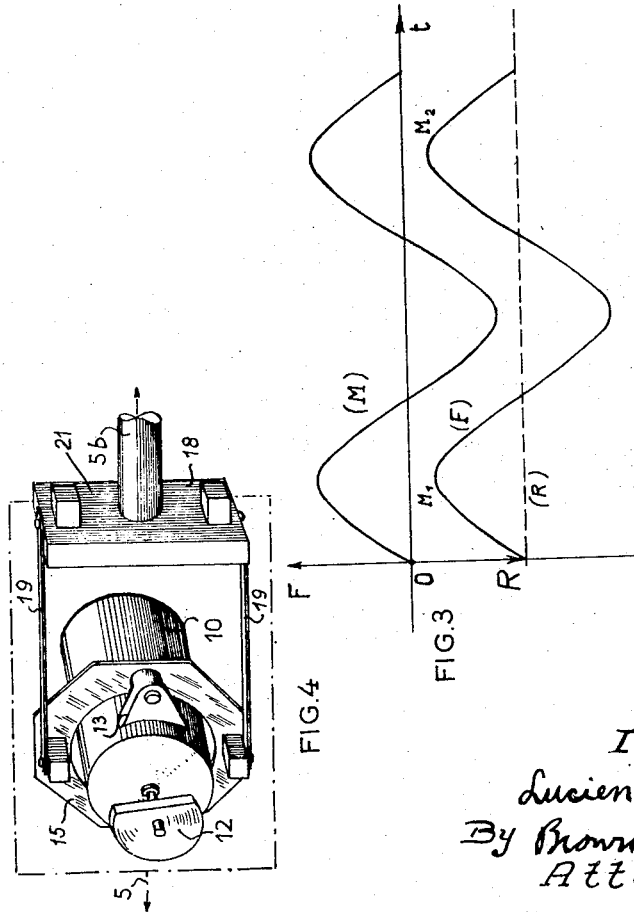
Inventor
Lucien Servanty
By Brown & Seward
Attorneys United States Patent Office 2,807,966
Patented Oct. 1, 1957

2,807,966
CONTROL TRANSMISSION SYSTEMS
Lucien Servanty, Paris, France
Application September 23, 1953, Serial No. 381,878
Claims priority, application France March 26, 1952
3 Claims. (Cl. 74—469)

This invention relates to control transmission systems, and more particularly to control transmissions of the double-acting type operable in opposite directions, and for example adapted, when operated in one direction, to produce an increase in a predetermined control effect and, when operated in the other direction, to produce a decrease in the said effect.

Still more particularly, the invention is applicable to servo-systems of the positional control type, in which a manual or automatic regulating action is to be transmitted through a servo-motor to a control member, for example a control surface of an aircraft.

This application is a continuation-in-part of my prior application Serial No. 337,405 filed February 17, 1953 for: "Control transmission systems."

In transmission system of the kind specified, it is a well known fact that passive resistances are always present, generally as the result of mechanical friction and the like, so that the initiation of a controlling displacement in either direction is required to exceed a predetermined "threshold" value before the control displacement can effectively be transmitted through the system. However, the power available for supplying the controlling force is usually limited, whether that power be derived from a manual source or from a mechanical regulator device. Moreover, in cases where the controlling action is derived from a mechanical regulating device, the lag in the control displacement due to the necessity of the controlling force exceeding the afore-mentioned threshold will often lead to objectionable large-amplitude oscillations or hunting. In all cases, the sensitivity of the control is objectionably diminished.

This invention has for its purposes to increase the sensitivity of control transmissions of the kind described and to reduce the force required to operate such a control transmission.

The invention has for its object to interpose in a control transmission of the type described, a device capable of adding to the constant passive resisting forces opposing the operation of the control a periodically varying force to obtain a periodically varying resultant resisting force, which permits operating the control with a considerably reduced force in the neighbourhood of the minima of said resultant.

In an embodiment of the invention, the above-mentioned device comprises a rotated eccentric mass, the centrifugal force of which is applied to the transmission control to ensure the obtention of the above-mentioned varying resisting force.

Now, the rotation of the eccentric mass driven from a motor mounted on a support directly interposed in a control transmission may give rise to objectionable vibrations liable to reduce the accuracy and sensitivity of the device.

A more particular object of the invention is therefore to provide a device of the type described in which the motor driving the eccentric mass is elastically mounted on the control transmission by means of a system elastically yieldable under vibrations in all directions right-angled with the direction of displacement of the transmission, but rigid with the latter in said direction of displacement.

With this arrangement, the transmission control is practically not influenced by vibrations originated from the device interposed therein.

The invention finds a particularly interesting application in aircraft controls where a high degree of sensitivity and a low actuating force are highly desirable.

One embodiment of the invention will now be described in detail with reference to the accompanying diagrammatic drawings, it being understood that both the description and the drawings are illustrative and not restrictive of the scope of the invention.

Fig. 1 illustrates an improved control transmission as applied to the irreversible servo-control of an aircraft control surface.

Fig. 2 is a sectional view on line II—II of Fig. 1.

Fig. 3 is a diagram illustrating the operation of a control transmission according to the invention.

Fig. 4 is a perspective view of a motor for rotating an eccentric mass according to the invention resiliently mounted on the transmission control.

Fig. 5 is a top view with partial horizontal section of the device of Fig. 4 and Fig. 6 is a rear view with partial vertical section of the device of Figs. 4 and 5.

As shown in Fig. 1, an improved servo transmission system for an aircraft control surface 3 pivoted to an airfoil 3a comprises a suitable irreversible servo-motor 1 having its output drivingly connected to control surface 3 through a linkage 2. A control member 4 is provided for regulating the motor 1 through a mechanical transmission system 5 in which considerable passive resistance forces are developed during use, primarily owing to friction. The control member 4 may be a manual lever, simultaneously operable from the output of a suitable automatic regulating device diagrammatically indicated at 6, e. g. controlled from one or more devices responsive to flight conditions.

According to the invention, a device is interposed at a suitable point of the transmission 5 to impart to the latter a periodically variable reciprocating force added to the resultant of the passive resisting forces to obtain a periodically varying resisting force.

In the illustrative example, the said device includes a lever comprising a pair of spaced parts 7a and 7b pivoted on a fixed axis 8. The separate elements 5a and 5b of the transmission 5 are interconnected through the said lever by pivotal attachment to the latter at the points 9, 9. Secured to the part 7b of the lever is a suitable drive device such as an electric motor 10 having secured to the drive shaft 11 thereof an eccentric mass 12 located between the lever parts 7a, 7b and so arranged that the plane of rotation of the eccentric mass 12 contains the direction of displacement of the transmission system 5.

The centrifugal force generated by the rotation of the eccentric mass 12 under the action of motor 10 has, in the directions of displacement of the control, a periodically-varying component (M) which, added to the resultant (R) of the passive forces, gives a periodically varying force F, as shown in Fig. 3, which is, then, the only force resisting the actuation of the control. It is obvious that the absolute value of said force F presents at each cycle a minimum, as shown at $M_1$, $M_2$, etc. In the neighbourhood of these minima, the value of which may be selected as low as desired, a slight actuating force exerted on lever 4 will be sufficient to operate the control. If a constant actuating force is applied to lever 4 in one direction, it will be understood that said actuating force will overcome the varying resisting force F during a short period in each cycle of the variations of said force F. The device would operate symmetrically if a constant force were applied in the opposite direction.

Thus, the control will be operated by a succession of short intermittent pulses. In the case of a hand-control, to give the operator the impression of continuity in the stress he exerts e. g. on lever 4, it suffices to rotate motor 10 at a comparatively high speed to reduce the time interval between the successive operating pulses.

The various parameters of the system, such as the speed of motor 10 and the weight and eccentric throw of mass 12 will be selected in each specific application according to the requirements of the transmission.

In particular, said parameters will be always so selected that the centrifugal force is never capable of displacing the control without the cooperation of the actuating means provided for this purpose.

An additional advantage of the device described above is that, in case of a failure of motor 10, there is no perturbation in the control transmission which then merely operates as if the device according to the invention were omitted.

In the example shown in Fig. 1, as already mentioned the eccentric mass is rotated in a plane containing the direction of displacement of the control transmission.

Now it may be interesting, in certain cases, in particular to make the device more compact or to improve its balance, or again for other constructive reasons, to have the eccentric mass rotating in a plane off-set with respect to said direction of displacement. In these conditions, the rotation of the eccentric mass gives rise to unwanted vibrations capable of subjecting the transmission to stresses and, more particularly, to torsional stresses or to vibrations transversal to the direction of displacement of the transmission.

In the embodiment shown in Figs. 4 to 6, a special elastic deformable mounting has been adapted for motor 10 in order to eliminate these objectionable vibration effects. In particular, the casing of motor 10 is supported, in the example shown, by means of lugs 13 and screws 14 on an octagonal elastic washer 15 capable of yielding under torsional stresses resulting from the shifting of the plane of rotation of mass 12 with respect to the axis of the transmission 5—5b. In the example shown, motor 10 is housed in a two-piece casing 16—17, part 16 of said casing being rigid with element 5b of the transmission, while part 17 is rigid with element 5 of said transmission. The parts 16 and 17 are assembled with the elements 5b and 5 by means of cooperating threadings 18' and 18. Motor 10 is furthermore secured on part 16 of said casing through a rubber pad or the like 20 yieldable in all directions. Finally, the octagonal washer 15 is connected with a supporting member 21, rigid with element 5b of the transmission, through two leaf springs 19 extending in a plane right-angled to the axis of rotation of the eccentric mass 12 and containing the direction of displacement of element 5b, each one of said leaf springs 19 being furthermore parallel to said direction of displacement.

With this arrangement, leaf springs 19 are rigid with element 5b solely in the direction of displacement of said element, while they are yieldable transversely to said direction.

This arrangement permits vibration of motor 10 in all directions, except in the direction of displacement of the transmission.

It will be understood that many alterations and improvements may be made in the structural details of the single embodiment illustrated and described, especially by the substitution of one or more means therein by functionally equivalent ones, and that many other embodiments of the invention can be conceived within the scope of the invention as defined in the ensuing claims.

What is claimed is:

1. A two-way transmission system for operating a movable member, comprising in combination, actuating means, a servo-motor for directly controlling said movable member, mechanical transmission means connecting said actuating means to said servo-motor, a supporting member interposed in said transmission means and said supporting member being directly coupled to said transmission means and adapted to move therewith, an eccentric mass rotatably mounted on said supporting member, driving means mounted on said supporting member for rotating said mass at high speed to generate a centrifugal force having a cyclically-varying component in the directions of displacement of said supporting member and longitudinally with respect to said transmission means, the said cyclically-varying component being thus added to the sum of the passive forces opposing displacement of said transmission means, to give a resultant cyclically-varying resistive force, the maximum values of which are never positive in the sense tending to produce motion of said transmission means, whereby the latter is enabled to regulate said servo-motor substantially at any desired instant.

2. In a two-way transmission control system for operating a movable member, the combination comprising: actuating means, a servo-motor for directly controlling said movable member, a mechanical transmission member connecting said actuating means to said servo-motor, means interposed in said transmission member and directly coupled thereto, for generating a cyclically-varying centrifugal force acting longitudinally in said transmission member, said means comprising a supporting member consisting of two plates rigidly coupled together and facing each other in parallel spaced relationship, pivot means for articulating said supporting member about its base with reference to a fixed body, further pivot means for coupling said supporting member adjacent its upper portion to each portion of said transmission member, an eccentric mass rotatably mounted between said plates at the upper portion of said supporting member, and an electric motor mounted on one side of said supporting member and adapted to drive said eccentric mass in rotation, for the purpose set forth.

3. In a two-way transmission control system for operating a movable member, the combination comprising, an actuating member, a servo-motor for directly controlling said movable member, a mechanical transmission member connecting said actuating member to said servo-motor, means interposed in said transmission member, and directly coupled thereto, for generating a cyclically-varying centrifugal force acting longitudinally in said transmission member, said means comprising: a two-part casing enclosing the said generating means, screwing means for coupling each half of said casing to the corresponding portion of said transmission member, a supporting member rigidly coupled to one half-casing, leaf-spring means fixed to each extremity of said member and extending parallel to the axis of said transmission member, an elastic washer fixed between said leaf-springs, said washer being mounted approximately in the vertical plane containing said transmission axis, an oscillation-generating device comprising an electric motor fastened to said washer and having an eccentric mass mounted on its extended shaft end, and an elastic pad arranged between said motor and said casing, said leaf-spring means and said elastic washer and said elastic pad constituting a three-fold resilient mounting, the arrangement being such that any transverse oscillations produced by said device are substantially damped and absorbed by said three-fold resilient mounting.

References Cited in the file of this patent

UNITED STATES PATENTS

| | | |
|---|---|---|
| 1,672,885 | Goldschmidt | June 12, 1928 |
| 2,323,479 | McCullough | July 6, 1943 |
| 2,498,034 | Erwood | Feb. 21, 1950 |

FOREIGN PATENTS

| | | |
|---|---|---|
| 672,884 | France | Sept. 24, 1929 |
| 84,447 | Germany | Dec. 19, 1895 |